US012753707B2

(12) United States Patent
Spathias et al.

(10) Patent No.: US 12,753,707 B2
(45) Date of Patent: Oct. 6, 2026

(54) MOTORIZED COMPRESSOR DEVICE WITH AIR BEARING HAVING REDUCED AXIAL AND RADIAL STACK-UP

(71) Applicant: Garrett Transportation I Inc., Torrance, CA (US)

(72) Inventors: Adonis Spathias, Glendora, CA (US); Eric Garcia, Mission Viejo, CA (US); Brent Donato, Torrance, CA (US)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 19/290,488

(22) Filed: Aug. 5, 2025

(65) Prior Publication Data

US 2025/0361819 A1 Nov. 27, 2025

Related U.S. Application Data

(62) Division of application No. 16/841,793, filed on Apr. 7, 2020, now abandoned.

(51) Int. Cl.
*F01D 25/16* (2006.01)
*F01D 5/14* (2006.01)
(Continued)

(52) U.S. Cl.
CPC ........... *F01D 25/162* (2013.01); *F01D 5/143* (2013.01); *F01D 25/243* (2013.01); *F02C 6/12* (2013.01);
(Continued)

(58) Field of Classification Search
CPC ........ F01D 25/16; F01D 25/162; F01D 25/24; F01D 25/243; F04D 29/056;
(Continued)

(56) References Cited

U.S. PATENT DOCUMENTS 6,746,206 B2 6/2004 Madsen et al.
10,502,263 B2 12/2019 Wood et al.
(Continued)

FOREIGN PATENT DOCUMENTS

CN 105422479 A * 3/2016 ........... F04D 29/059
CN 108050085 A 5/2018
(Continued)

*Primary Examiner* — Nathaniel E Wiehe
(74) *Attorney, Agent, or Firm* — BelayIP

(57) ABSTRACT

A turbomachine includes a housing assembly having a first housing member with a shroud surface, a bearing housing, and a second housing member. The turbomachine further includes a bearing that supports rotation of a rotating group within the housing assembly. The first housing member has a first axial surface and the bearing housing has a second axial surface that is substantially flush with the first axial surface. The second housing member has a third axial surface facing in an axial direction opposite that of the first and second axial surfaces. The first housing member has a first radial surface and the bearing housing has a second radial surface. The first housing member and the bearing housing are attached to the second housing member. The first and second axial surfaces abut against the third axial surface, and the first radial surface abutting against the second radial surface.

11 Claims, 4 Drawing Sheets

(51) Int. Cl.

| | |
|---|---|
| ***F01D 25/24*** | (2006.01) |
| ***F02C 6/12*** | (2006.01) |
| ***F04D 17/10*** | (2006.01) |
| ***F04D 29/056*** | (2006.01) |
| ***F04D 29/42*** | (2006.01) |
| ***F04D 29/44*** | (2006.01) |

(52) U.S. Cl.
CPC ........... *F04D 17/10* (2013.01); *F04D 29/056* (2013.01); *F04D 29/4206* (2013.01); *F04D 29/441* (2013.01); *F05D 2230/18* (2013.01)

(58) Field of Classification Search
CPC .... F04D 29/4206; F04D 29/441; F04D 17/10; F04D 25/06; F02C 6/12; F16C 32/0614
See application file for complete search history.

(56) References Cited

U.S. PATENT DOCUMENTS

| | | | |
|---|---|---|---|
| 11,686,325 | B2 | 6/2023 | Gashi et al. |
| 2015/0275920 | A1 | 10/2015 | Thompson et al. |
| 2018/0306209 | A1 | 10/2018 | Nejedly et al. |
| 2019/0145416 | A1 | 5/2019 | Donato et al. |

FOREIGN PATENT DOCUMENTS

| | | | |
|---|---|---|---|
| CN | 110425156 | A | 11/2019 |
| DE | 102011113327 | A1 | 3/2021 |
| EP | 3557081 | A1 | 10/2019 |
| WO | 2012087907 | A2 | 6/2012 |

* cited by examiner

MOTORIZED COMPRESSOR DEVICE WITH AIR BEARING HAVING REDUCED AXIAL AND RADIAL STACK-UP

CROSS REFERENCE TO RELATED APPLICATION

The following is a divisional of U.S. patent application Ser. No. 16/841,793, filed Apr. 7, 2020, the entire disclosure of which is incorporated by reference.

TECHNICAL FIELD

The present disclosure generally relates to a compressor and, more particularly, relates to a motorized compressor device with an air bearing having reduced axial and radial stack-up.

BACKGROUND

Turbomachines generally include a housing and a rotating group housed therein. The rotating group includes a wheel that opposes a shroud surface of the housing to define a fluid gap therebetween. The fluid gap, during operation of the machine, receives a fluid flow. The fluid gap is an important feature as it affects performance of the turbomachine. In many cases, a smaller fluid gap leads to increased efficiency during operation.

However, manufacturing and/or design of these turbomachines presents certain problems. For example, the turbomachine includes a plurality of parts, and the assembly of parts can create an excessive tolerance stack-up. Tolerance stack-up represents the worst-case cumulative effect of part tolerance with respect to an assembly. Since the fluid gap is an important feature of a turbomachine, the tolerance stack-up of the assembly is compared to the available fluid gap between the wheel of the rotating group and the shroud surface of the housing. In some cases, if the tolerance stack-up is excessive, then the fluid gap is likely to be larger, which can detrimentally affect performance of the turbomachine.

Thus, it is desirable to provide a turbomachine that has a reduced tolerance stack-up. It is further desirable for the turbomachine to be compact and highly manufacturable. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a housing assembly. The housing assembly includes a first housing member with a shroud surface, a bearing housing, and a second housing member. The turbomachine also includes a rotating group with a wheel that opposes the shroud surface to define a fluid gap therebetween. The turbomachine further includes a bearing that supports rotation of the rotating group within the housing assembly about an axis of rotation. At least part of the bearing is housed by the bearing housing. The first housing member has a first axial surface and the bearing housing has a second axial surface that is substantially flush with the first axial surface. The second housing member has a third axial surface facing in an axial direction opposite that of the first and second axial surfaces. The first housing member has a first radial surface and the bearing housing has a second radial surface. The first and second radial surfaces face in opposing radial directions relative to the axis of rotation. The first housing member and the bearing housing are attached to the second housing member with the fluid gap defined between the wheel and the shroud surface. The first and second axial surfaces abut against the third axial surface, and the first radial surface abuts against the second radial surface.

In another embodiment, a motorized compressor device is disclosed that includes a housing assembly. The housing assembly includes a compressor housing with a shroud surface, a bearing housing, and a motor housing. The compressor device also includes a rotating group with a compressor wheel that opposes the shroud surface to define a fluid gap therebetween. Furthermore, the compressor device includes an air bearing that supports rotation of the rotating group within the housing assembly about an axis of rotation. At least part of the air bearing is housed by the bearing housing. The compressor device also includes an electric motor housed within the motor housing. The electric motor is configured to drivingly rotate the rotating group within the housing assembly. The compressor housing has a first axial surface and the bearing housing has a second axial surface that is substantially flush with the first axial surface. The motor housing has a third axial surface facing in an axial direction opposite that of the first and second axial surfaces. The compressor housing has a first radial surface and the bearing housing has a second radial surface. The first and second radial surfaces face in opposing radial directions relative to the axis of rotation. The compressor housing and the bearing housing are attached to the motor housing with the fluid gap defined between the compressor wheel and the shroud surface. The bearing housing at least partially encloses the electric motor within the motor housing. The first and second axial surfaces abut against the third axial surface, and the first radial surface abuts against the second radial surface.

In a further embodiment, a method of manufacturing a turbomachine is disclosed. The method includes attaching a first housing member with a shroud surface to a second housing member with a rotating group disposed therein. The rotating group has a wheel that opposes the shroud surface to define a fluid gap therebetween. The method also includes attaching a bearing housing to the second housing member. A bearing is at least partly housed by the bearing housing. The bearing supports rotation of the rotating group about an axis of rotation. The first housing member has a first axial surface and the bearing housing has a second axial surface that is substantially flush with the first axial surface. The second housing member has a third axial surface facing in an axial direction opposite that of the first and second axial surfaces. The first housing member has a first radial surface and the bearing housing has a second radial surface. The first and second radial surfaces face in opposing radial directions relative to the axis of rotation. The first housing member and the bearing housing are attached to the second housing member with the fluid gap defined between the wheel and the shroud surface. The first and second axial surfaces abut against the third axial surface, and the first radial surface abuts against the second radial surface.

BRIEF DESCRIPTION OF THE DRAWINGS

The present disclosure will hereinafter be described in conjunction with the following drawing FIGURES, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbomachine with a housing and a rotating group housed therein. The rotating group has a wheel that opposes a shroud surface of the housing, and a fluid gap is defined therebetween. The turbomachine of the present disclosure has a relatively low number of components and the tolerance stack-up of these parts assembled together is relatively low. Specifically, there are relatively few parts affecting the radial and/or axial positioning of the wheel relative to the shroud surface. Thus, variability between parts has less effect on the fluid gap dimensions. Also, the manufacturability of the turbomachine is increased as a result. Ultimately, more efficient turbomachines can be produced because turbomachines with reduced fluid gaps can be repeatably made in high volume.

Figure 1:
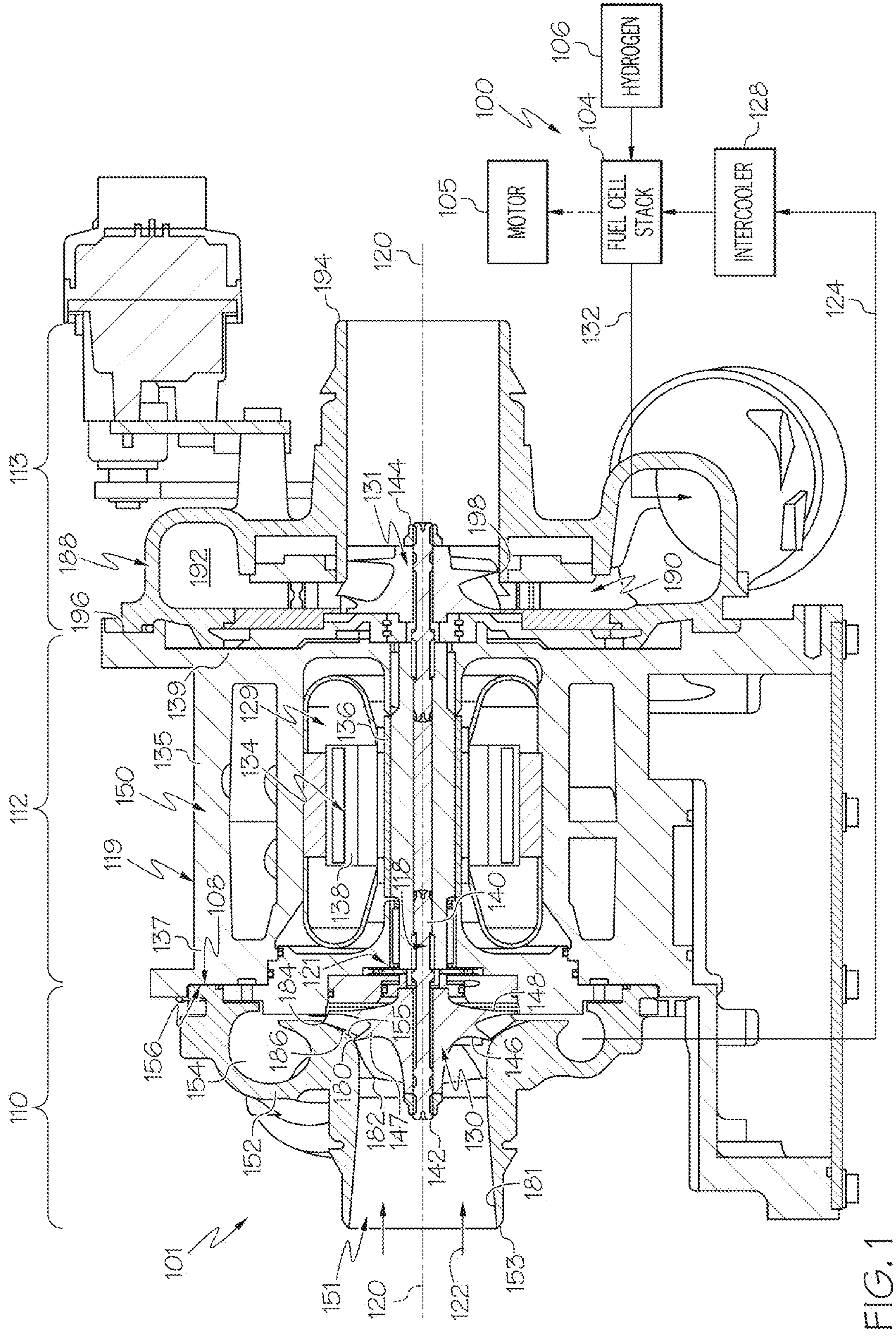
FIG. 1 is a schematic view of a fuel cell system with a motorized compressor device according to example embodiments of the present disclosure.

Referring initially to FIG. 1, a turbomachine 101 is shown according to example embodiments. As shown, the turbomachine 101 generally includes a rotating group 118 and a housing assembly 119. The rotating group 118 is supported for rotation within the housing assembly 119 about an axis of rotation 120 by one or more bearings 121.

The rotating group 118 may generally include an elongate, cylindrical shaft 140 with a first end 142 and a second end 144. The rotating group 118 may also include one or more wheels, such as a compressor wheel 130 that is supported on the first end 142 of the shaft 140 and a turbine wheel 131 that is supported on the second end 144. The housing assembly 119 includes a variety of parts that cooperatively house the rotating group 118. Cooperatively, the housing assembly 119 and the rotating group 118 defines various sections of the turbomachine 101, such as a motor section 112, a compressor section 110, and a turbine section 113.

The turbomachine 101 may be operatively connected to a fuel cell system 100 and may be configured as an e-charger or electric motorized compressor device for the fuel cell system 100. However, it will be appreciated that the turbomachine 101 may configured differently from the embodiments shown and that the turbomachine 101 may be incorporated in another system without departing from the scope of the present disclosure. The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. In some embodiments, the fuel cell system 100 may be included in a vehicle, such as a car, truck, sport utility vehicle, van, motorcycle, etc. Therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the turbomachine 101. More specifically, the motor section 112 may drive rotation of the rotating group 118, and the compressor section 110 may provide a compressed air stream to an intercooler 128 as it flows to the stack 104, and exhaust from the stack 104 may be fed back to the turbine section 113 for providing power assist to the motor section 112. It will be appreciated, however, that other embodiments of the turbomachine 101 fall within the scope of the present disclosure. For example, in some embodiments, the turbine section 113 may be omitted such that the turbomachine 101 includes the motor section 112 as well as the compressor section 110. Additionally, in some embodiments, the turbomachine 101 may include a plurality of sections, such as a plurality of compressor sections that are fluidly connected in succession to include a first (low pressure) stage that feeds a second (high pressure) stage that ultimately feeds the fuel cell system 100. Additional embodiments of the turbomachine 101 may be provided in other systems (other than the fuel cell system 100) without departing from the scope of the present disclosure.

Components of the motor section 112, compressor section 110, and turbine section 113 will now be discussed according to example embodiments. These details are illustrated in FIGS. 1-4; however, these are merely example embodiments of the present disclosure.

The motor section 112 may include an electric motor 134 for driving rotation of the rotating group 118 and/or converting rotational power of the rotating group 118 into electrical power. The motor 134 may generally include a rotor 136 and a stator 138 of a known type. The rotor 136 may be mounted on the shaft 140, and the stator 138 may encircle the rotor 136. The first end 142 and second end 144 of the shaft 140 may extend from respective axial sides of the motor 134 and may be supported in a motor housing 150 of the housing assembly 119. The motor housing 150 may be hollow and/or may include a motor cavity 129 that receives the motor 134. In some embodiments, the motor housing 150 may include a hollow base body 135 with a first, open axial end 137 and a substantially closed second axial end 139 (FIG. 1). The open axial end 137 may be covered over by other components that will be described below to substantially close off the open axial end 137 and to cover over and enclose the motor 134 within the motor cavity 129. The motor 134 may be operatively attached to the rotating group 118 for driving rotation of the rotating group 118 within the housing assembly 119 about the axis 120.

As shown in FIGS. 1-4, the compressor section 110 may include the compressor wheel 130, which is housed within a compressor housing 152 of the housing assembly 119. The compressor housing 152 may be a unitary, one-piece member. In some embodiments, the compressor housing 152 may be manufactured via casting operations, via additive manufacturing processes, or otherwise. At least some of the surfaces of the compressor housing 152 may be ground, polished, or otherwise conditioned to provide a predetermined surface roughness, smoothness, or other characteristic. The compressor housing 152 may include a tubular inlet 153 that is centered on the axis 120. The compressor housing 152 may also be hollow and a flow path 151 may extend axially in a downstream direction and then may turn outward radially with respect to the axis 120. Further downstream, the inner surface of the compressor housing 152 may define a volute passage 154 that extends about the axis 120. It will be appreciated that the flow path 151 may vary from the illustrated embodiments and may have a variety of shapes, profiles, and configurations without departing from the scope of the present disclosure.

The compressor housing 152 may include an axial face 108 that opposes an axial face 156 of the base body 135 of the motor housing 150. Portions of the axial face 108 may be attached and/or mate against the axial face 156 as will be described in detail below. At least some of the mating surfaces may be ground, polished, or otherwise conditioned to provide a predetermined surface roughness, smoothness, or other characteristic that ensures robust attachment. The compressor housing 152 may be fixed to the base body 135 of the motor housing 150 and may cover over a front side 146 of the compressor wheel 130. A back side 148 of the compressor wheel 130 may face toward the motor section 112. Accordingly, the compressor wheel 130 may be disposed within the compressor housing 152 and may directly oppose a shroud surface 155 of the compressor housing 152. The shroud surface 155 may be contoured inversely and according to the outer contour of the compressor wheel 130. The compressor housing 152 may also include a radially-inward facing inlet surface 181 disposed further upstream of the shroud surface 155 and the compressor wheel 130. Moreover, the compressor housing 152 may include a diffuser surface 183 disposed downstream of the shroud surface 155 and the compressor wheel 130 and that faces axially toward the motor section 112. The volute passage 154 may be disposed downstream of the diffuser surface 183.

Figure 2:
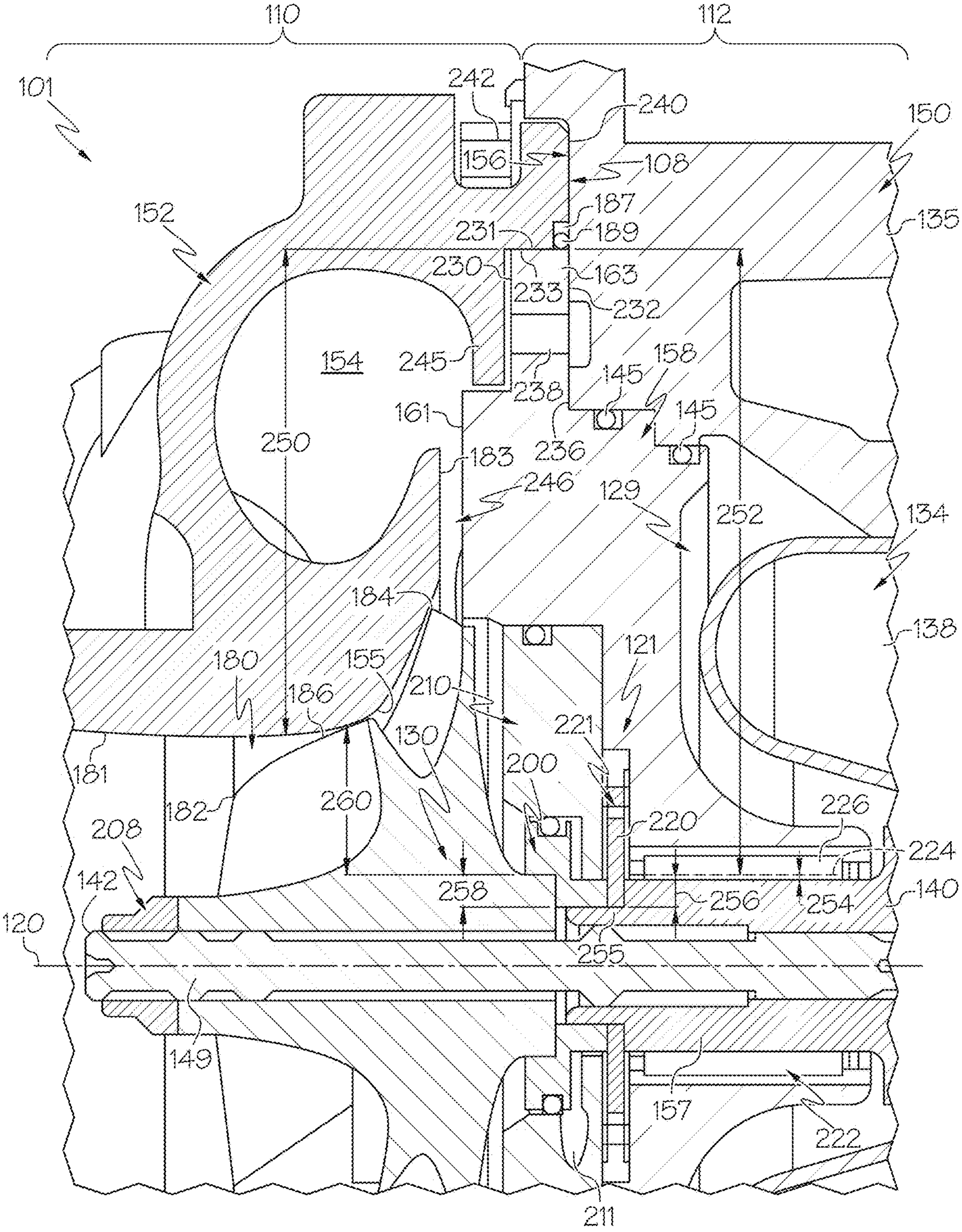
FIG. 2 is a detail section view of the compressor device of FIG. 1.
Figure 3:
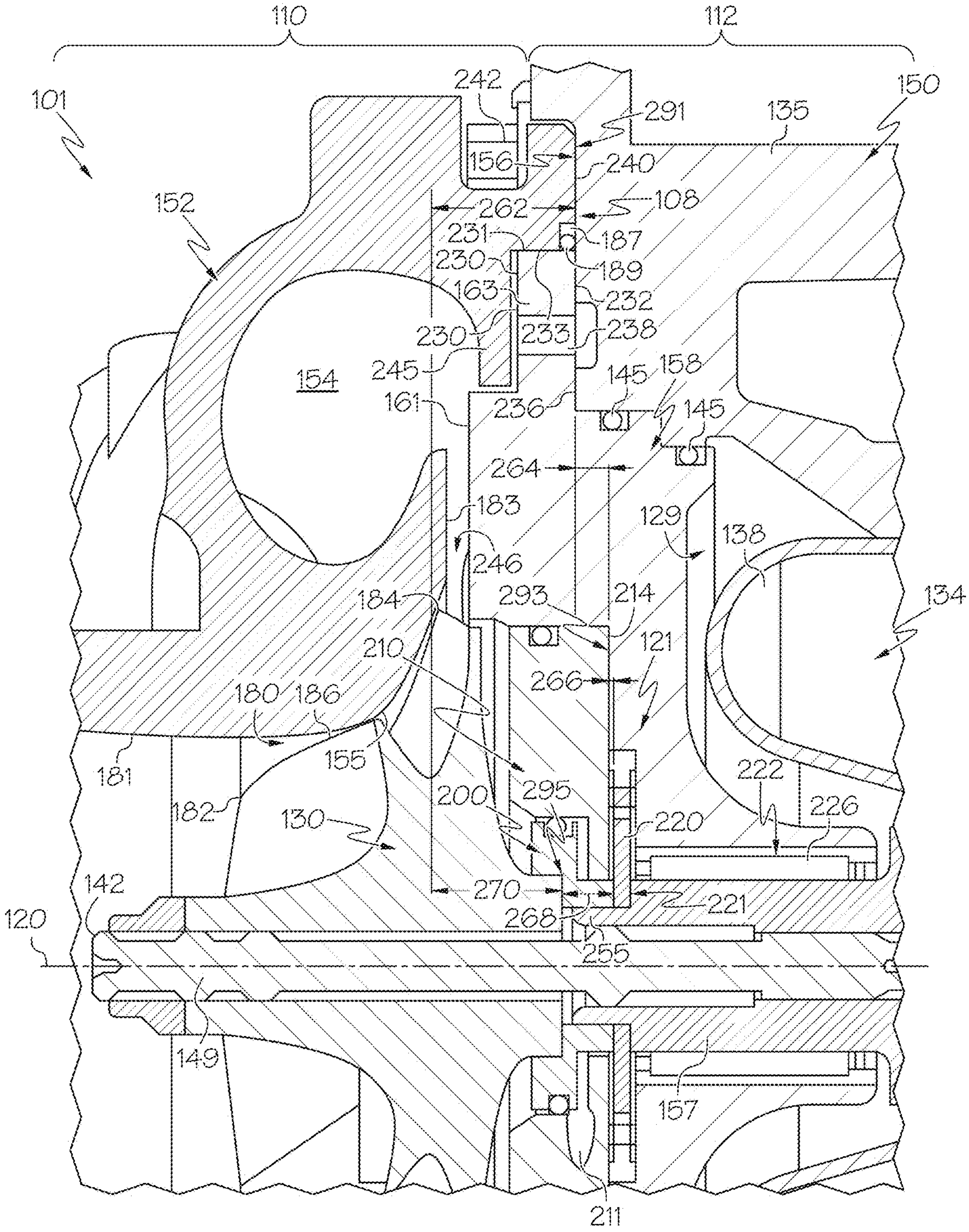
FIG. 3 is a detail section view of the compressor device of FIG. 1.

As shown in FIGS. 2 and 3, the compressor wheel 130 may include a plurality of blades 147 that oppose the shroud surface 155 of the compressor housing 152. The blades may include a respective leading end 182, a trailing end 184, and an outer edge 186. Collectively, the leading ends 182, trailing ends 184, and outer edges 186 may be respectively aligned about the axis 120 so as to collectively define the leading end 182, trailing end 184, and outer edge 186 for the compressor wheel 130.

A fluid gap 180 may be defined between the wheel 130 and the shroud surface 155. More specifically, the fluid gap 180 may be defined radially between the shroud surface 155 and wheel 130 and axially from the leading end 182 to the trailing end 184 of the wheel 130. The fluid gap 180 may have a variety of shapes and dimensions without departing from the scope of the present disclosure. For example, the fluid gap 180 may have a constant width (measured normal to the shroud surface 155). Alternatively, the width of the fluid gap 180 may vary along its length as illustrated in FIGS. 2 and 3.

As shown in FIG. 1, the turbine section 113 may include the turbine wheel 131, which is housed within a turbine housing 188 of the housing assembly 119. The turbine housing 188 may define a turbine flow path 190 with a volute inlet passage 192 and an axial tubular outlet 194 that is centered on the axis 120. In some embodiments, the turbine housing 188 may be a unitary (single piece) component that is manufactured via casting operations, via additive manufacturing processes, or otherwise. The turbine housing 188 may be fixedly attached to a second axial face 196 of the base body 135 of the motor housing 150, on an axial side opposite the compressor section 110. The turbine housing 188 may cover over the turbine wheel 131 with a fluid gap 198 defined therebetween.

During operation of the turbomachine 101, an inlet airstream (represented by arrows 122 in FIG. 1) may flow into the inlet 153, and the inlet airstream 122 may be compressed as it flows downstream between the compressor wheel 130 and the compressor housing 152 and into the volute passage 154. A compressed airstream (represented by arrow 124) may exit the volute passage 154 and may be directed to the intercooler 128 and then to the fuel cell stack 104 for boosting the operating efficiency of the fuel cell system 100.

Furthermore, in some embodiments, an exhaust gas stream (represented by arrow 132) from the fuel cell stack 104 may be directed back toward the turbomachine 101 and received by the volute inlet passage 192 of the turbine section 113. The exhaust gas stream 132 may, thus, drive rotation of the turbine wheel 131 before flowing to the outlet 194. Mechanical power from the turbine section 113 may be converted to electrical power for the motor 134 for ultimately assisting in rotation of the compressor wheel 130.

Figure 4:
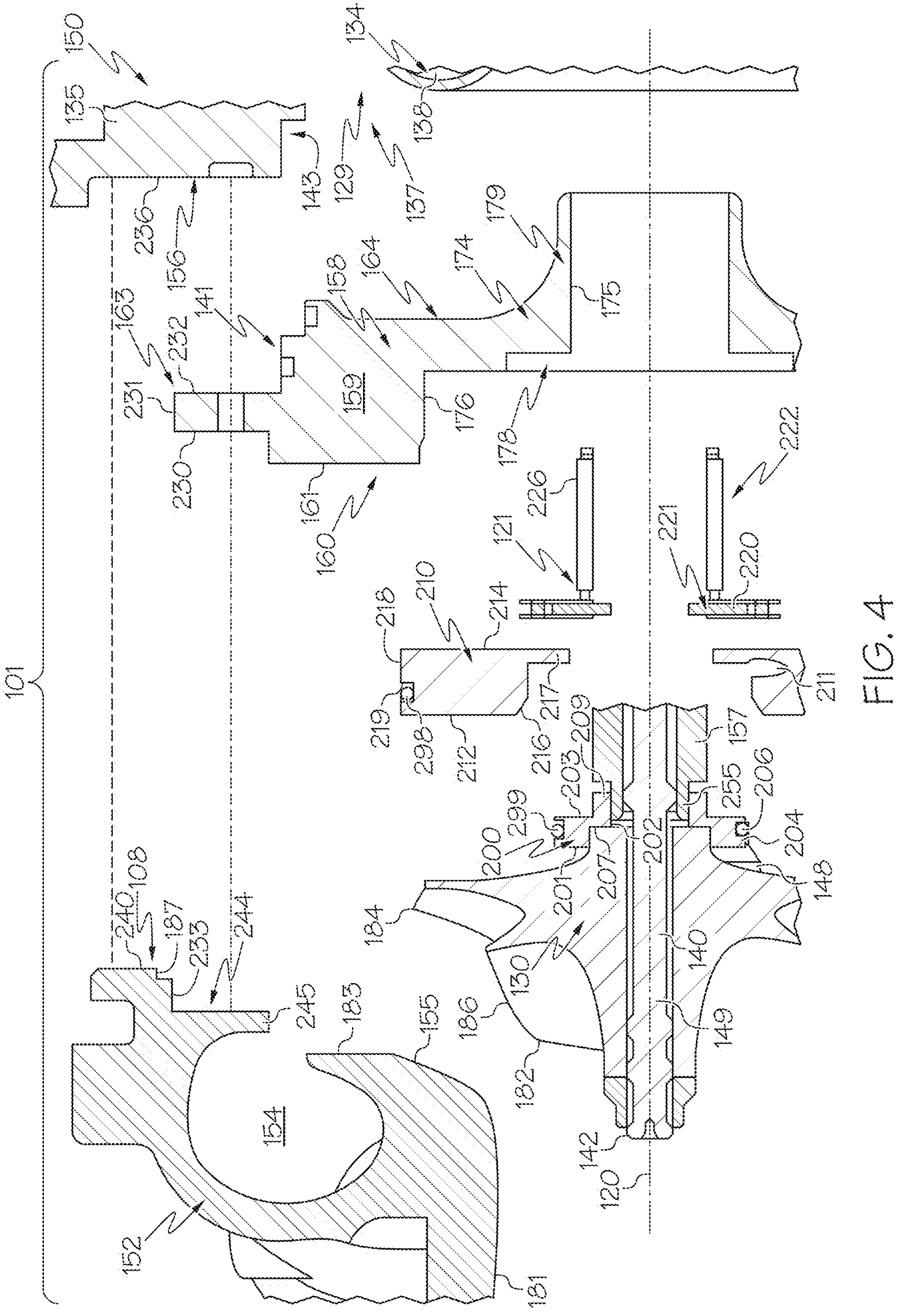
FIG. 4 is an exploded section view of the compressor device of FIG. 1.

Referring now to FIGS. 2-4, additional features of the turbomachine 101 and assembly of the turbomachine 101 will now be discussed in more detail. Because of these features, the turbomachine 101 can have a relatively low part count and the tolerance stack-up of these parts assembled together can be relatively low. These features will be discussed primarily in relation to the compressor section 110, the motor section 112, and components of the bearing 121 within these sections. As will be discussed, the compressor section 110, motor section 112 and components of the bearing 121 may be configured with relatively few parts affecting the radial and/or axial positioning of the compressor wheel 130 relative to the shroud surface 155. It will be appreciated that these features could be included for the turbine section 113 or in another turbine machine for affecting the tolerance stack-up at the fluid gap 198 without departing from the scope of the present disclosure.

As mentioned above and as shown in FIGS. 2-4, the first end 142 of the shaft 140 may include a post 149 that is centered on the axis 120 and fixed within a sleeve 157. The post 149 projects axially from the sleeve 157 and the compressor wheel 130 is fixed thereon. In some embodiments, the compressor wheel 130 may be fixed axially on the post 149 between a nut 208 and a collar 200. The collar 200 may be annular and may include a front side 201 and a back side 203 (FIG. 4). The front side 201 of the collar 200 may face the compressor wheel 130, and the back side 203 may face axially in the opposite direction. Also, the collar 200 may include an inner diameter portion 202 with a hole that receives a neck area 255 of the sleeve 157. The inner diameter portion 202 may also include a front side recess 207 that is recessed axially to receive a hub of the compressor wheel 130. The hub of the compressor wheel 130 may be pressed against an opposing axial surface of the front side recess 207 at an interface 295 (FIG. 3). The interface 295 may lie within a plane that extends radially with respect to the axis 120. Moreover, the inner diameter portion 202 may include a back side projection 209 that projects axially away from the compressor wheel 130 and that receives the neck area 255 of the sleeve 157 and that is fixed thereto. Additionally, the collar 200 may include an outer diameter portion 204 with an outer diameter groove 206 formed thereon.

Embodiments of the bearing 121 are also shown in detail in FIGS. 2-4. As shown, the bearing 121 may be configured as a plain bearing, an air bearing, and/or an oil-less bearing. As shown, the bearing 121 may include a thrust bearing member 221 that supports the rotating group 118 primarily against thrust loads directed along the axis 120. The thrust bearing member 221 may include a thrust disc 220. The thrust disc 220 may be an annular disc that is relatively flat and that is received on the shaft 140, between the back side projection 209 of the collar 200 and shoulder of the sleeve 157. Moreover, the bearing 121 may include a journal bearing member 222 that supports the rotating group 118 primarily against radial loads directed radial to the axis 120. The journal bearing member 222 may include a journal housing 226 with an inner diameter surface 224 (FIG. 2). The journal housing 226 may be cylindrical and may encircle the sleeve 157 of the shaft 140 with one end proximate the thrust disc 220 and the other end direct directed axially away from the first end 142 of the shaft 140.

Furthermore, the journal bearing member 222 and the thrust bearing member 221 may be partially defined by and/or supported by structures of the housing assembly 119. For example, the housing assembly 119 may include a thrust cover 210 that supports the thrust disc 220. As shown in FIG. 4, the thrust cover 210 may be annular and may include a front side 212 that faces axially toward the compressor wheel 130. The thrust cover 210 may also include a back side 214 that faces axially in the opposite direction. The thrust cover 210 may include an outer diameter portion 218 with a groove 219 defined thereon. The thrust cover 210 may further include an inner diameter portion 216 that receives the collar 200. The inner diameter portion 216 may be sealed against the outer diameter portion 204 of the collar 200 by a sealing member 299 disposed within the groove 206. The thrust cover 210 may further include a back radial flange 217. The back radial flange 217 may project radially inward from the inner diameter portion 216 and may encircle the back side projection 209 of the collar 200. Furthermore, the back radial flange 217 may be disposed axially between the back side 203 of the collar 200 and the thrust disc 220. The back radial flange 217 may be spaced axially away from the thrust disc 220 to define a gap that receives a thin fluid film that supports rotation of the rotating group 118 within the housing assembly 119. The thrust cover 210 may include an inlet 211 that supplies air to the thrust disc 220. This fluid may flow further toward the journal housing 226 to support the journal bearing member 222. This air supply may also cool the bearing 121 during operation.

Additionally, the housing assembly 119 may include a bearing housing 158. The bearing housing 158 may be a unitary, one-piece, annular part in some embodiments. As shown in FIG. 4, the bearing housing 158 may include a support body 159 with a first axial face 160. The first axial face 160 may include a first axial surface 161 that is flat and substantially perpendicular to the axis 120. The bearing housing 158 may further include a second axial face 164 that faces in an axial direction opposite that of the first axial face 160. The bearing housing 158 may also include an outer radial edge flange 163 that projects radially outward from the support body 159. The outer radial edge flange 163 may include a first axial surface 230 and a second axial surface 232. The first axial surface 230 may be flat and perpendicular to the axis 120. The second axial surface 232 may face in the opposite direction. An outer edge surface 231 may extend between the first and second axial surfaces 230, 232 and may have a substantially constant radius. Also, the first axial surface 230 may be stepped relative to the first axial surface 161 axially away from the first end 142. The support body 159 may further include an inner diameter surface 176 that faces inward radially toward the axis 120.

The bearing housing 158 may also include a bearing support portion 174 on an inner radial portion thereof for housing, supporting, and/or partly defining the bearing 121. The bearing support portion 174 may have a tapered and concavely contoured outer surface and may define a back side projection 179 that projects axially away from the first end 142 of the shaft 140. The bearing support portion 174 may include a front recess 178 at the axial face 160. Additionally, a radius of an inner diameter surface 175 of the bearing support portion 174 (including the projection 179) may remain substantially constant along its axial length.

The thrust cover 210 may be attached to the bearing housing 158 to cover over the thrust disc 220 within the recess 178. Specifically, the thrust cover 210 may be received in the bearing housing 158 with the surface 176 radially opposing the outer diameter portion 218. A sealing member 298 (e.g., an O-ring) may be received in the groove 219 to form a fluid seal between the opposing radial surfaces of the thrust cover 210 and the bearing housing 158. The back side 214 of the thrust cover 210 may also mate against an opposing axial surface of the bearing housing 158 at an interface 293 (FIG. 3). The interface 293 may lie substantially within a plane that extends radially with respect to the axis 120. The back side 214 and the opposing axial surface of the bearing housing 158 may be polished, ground, or otherwise treated to provide predetermined surface characteristics thereto (e.g., low surface roughness, high smoothness, etc.). Also, the thrust disc 220 may be received in the recess 178 of the bearing housing 158, and the thrust cover 210 may cover over the thrust disc 220 therein. Moreover, the back side projection 179 may receive the journal housing 226.

Also, the bearing housing 158 may be received partly within the motor cavity 129 of the motor housing 150. As shown, a stepped outer diameter surface 141 of the bearing housing 158 may be sealed against a corresponding inner diameter surface 143 of the motor housing 150 via one or more sealing member 145 (e.g., O-rings). The inner radial portion of the bearing housing 158, including the bearing support portion 174, may cover over the open axial end 137 of the base body 135 and the stator 138 contained within the motor cavity 129.

In addition, the outer radial edge flange 163 may be received axially between the compressor housing 152 and the motor housing 150 with the first axial surface 230 facing toward the compressor housing 152 and the second axial surface 232 facing toward the motor housing 150. Specifically, in some embodiments, the second axial surface 232 may abut, overlay, and/or overlap an opposing axial end surface 236 of the base body 135 of the motor housing 150. One or both surfaces 232, 236 may be a ground or polished surface that exhibits low surface roughness and high smoothness (i.e., ground or polished to a predetermined surface roughness or smoothness). These mating surfaces 232, 236 may extend normal to the axis 120 and circumferentially about the axis 120. In addition, these surfaces 232, 236 may be secured together via one or more fasteners 238 (e.g., bolts) extending axially therebetween.

Furthermore, the compressor housing 152 may be fixed to the base body 135 of the motor housing 150 and may be fit over the bearing housing 158. Specifically, the compressor housing 152 may include an outer axial surface 240 that abuts, overlays, and/or overlaps the axial end surface 236 of the base body 135. The outer axial surface 240 may be a ground or polished surface that exhibits low surface roughness and high smoothness (i.e., ground or polished to a predetermined surface roughness or smoothness) for mating against the axial end surface 236. These mating surfaces 240, 236 may extend normal to the axis 120 and circumferentially about the axis 120. In addition, these surfaces 240, 236 may be secured together via one or more fasteners 242 (e.g., nuts and bolts) extending axially therebetween.

The axial face 108 of the compressor housing 152 may further include a recess 244 (FIG. 4) that receives the flange 163 of the bearing housing 158. The recess 244 may be partly defined by an inner diameter surface 233 of the compressor housing 152. The recess 244 may be sized such that there is a small axial gap between the first axial surface 230 and the opposing axial surface of the compressor housing 152. Likewise, the recess 244 may be sized such that at least part of the inner diameter surface 233 abuts against the outer edge surface 231 of the bearing housing 158. Both surfaces may be ground, polished, etc. to exhibit low surface roughness and high smoothness for a high-tolerance radial fit therebetween. Additionally, an inner lip 245 of the compressor housing 152 may receive the support body 159 of the bearing housing 158 and may radially oppose an outer diameter surface of the support body 159 with a small radial gap therebetween. The compressor housing 152 may include an inner rim notch 187 that receives a sealing member 189 (e.g., an O-ring) that seals against the inner surfaces of the notch 187, the outer edge surface 231, and the axial end surface 236 to fluidly seal this junction.

Moreover, in this position, the first axial surface 161 of the bearing housing 158 and the diffuser surface 183 of the compressor housing 152 may face in opposite axial directions and may be separated apart at a distance to define a diffuser area 246 of the compressor flow path 151. The diffuser area 246 is disposed outward radially from the trailing end 184 of the compressor wheel 130 before the volute passage 154.

As shown in FIGS. 2 and 3, the axial end surface 236 of the base body 135 of the motor housing 150 may be a flat, smooth surface that extends normal to the axis 120. The second axial surface 232 of the bearing housing 158 may also be a flat, smooth surface that extends normal to the axis 120 and that overlies and abuts against the axial end surface 236. The outer axial surface 240 of the compressor housing 152 may be a flat, smooth surface that is substantially flush with the second axial surface 232 and that overlies and abuts against the axial end surface 236 of the motor housing 150. As such, the base body 135 of the motor housing 150 may mate against both the second axial surface 232 and the axial surface 240 along an interface 291 (FIG. 3), which lies in a common plane extending normal to the axis 120. In some embodiments, this is a so-called "shim-less" joint since no shims or related components are included. Moreover, the compressor housing 152 may register radially to the bearing housing 158 with at least part of the inner diameter surface 233 mating and abutting the outer edge surface 231. This arrangement provides certain advantages. For example, the compressor section 110 may be constructed and assembled with the dimensions of the fluid gap 180 built within high tolerances. This arrangement can also make the compressor section 110 very compact, highly manufacturable, and with a relatively low part count.

This arrangement may have a reduced axial and/or radial tolerance stack-up affecting the fluid gap 180. In other words, there are relatively few parts in this arrangement, and they are arranged compactly such that there is a reduced tolerance stack-up affecting the fluid gap 180.

Specifically, as represented in FIG. 2, the radial tolerance stack-up affecting the fluid gap 180 may include: (a) a first radial distance 250 measured between the inner diameter surface of the recess 244 (i.e., the radial register surface of the compressor housing 152) and the shroud surface 155; (b) a second radial distance 252 measured between the outer edge surface 231 to the inner diameter surface 224 of the journal housing 226; (c) a third radial distance 254 measured between the inner diameter surface 224 of the journal housing 226 to the underlying outer diameter surface of the shaft 140; (d) a fourth radial distance 256 measured between the outer diameter surface of the shaft 140 to the neck area 255 of the shaft 140; (e) a fifth radial distance 258 measured between the inner diameter surface of the collar 200 at the neck area 255 and the inner diameter surface of the collar 200 at the hub of the compressor wheel 130; and (f) a sixth radial distance 260 measured between the interface at the collar 200 and wheel 130 to the outer edge 186 of the wheel 130.

Furthermore, as represented in FIG. 3, the axial tolerance stack-up affecting the fluid gap 180 may include: (a) a first axial distance 262 measured between the interface 291 and the shroud surface 155 (i.e., between the axial register surface 240 of the compressor housing 152 and the shroud surface 155); (b) a second axial distance 264 measured from the interface 291 to the interface 293 of the bearing housing 158 and the thrust cover 210; (c) a third axial distance 266 measured between the back side 214 of the thrust cover 210 to the opposing side of the thrust disc 220; (d) a fourth axial distance 268 measured between the thrust disc 220 and the interface 295 of the collar 200 and hub of the wheel 130; and (e) a fifth axial distance 270 measured from the interface 295 to the trailing end 184 of the wheel 130.

Accordingly, the compressor section 110 is configured with a reduced number of features contributing to the radial and axial tolerance stack-up affecting the fluid gap 180. The motor housing 150 has little-to-no effect on the radial and/or axial tolerance stack-up of the fluid gap 180. Both the compressor housing 152 and the bearing housing 158 may register axially against the common surface 236; however, the motor housing 150 does not contribute to the radial stack-up affecting the fluid gap 180. In other words, the components of the compressor section 110 may be attached together to define the fluid gap 180 largely independent of the motor housing 150.

Thus, the compact arrangement of the compressor section 110 provides the advantages discussed above. For example, the compressor section 110 may be constructed such that the dimensions of the fluid gap 180 are held within tight tolerances. The part count can be relatively low. The compressor section 110 can also be manufactured at high volume in a repeatable manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A method of manufacturing a turbomachine comprising:

attaching a first housing member with a shroud surface to a second housing member with a rotating group disposed therein, the rotating group having a wheel that opposes the shroud surface to define a fluid gap therebetween;

attaching a bearing housing to the second housing member, a bearing being at least partly housed by the bearing housing, the bearing supporting rotation of the rotating group about an axis of rotation;

the first housing member having a first axial surface and the bearing housing having a second axial surface that is flush with the first axial surface;

the second housing member having a third axial surface facing in an axial direction opposite that of the first and second axial surfaces;

the first housing member having a first radial surface and the bearing housing having a second radial surface, the first and second radial surfaces facing in opposing radial directions relative to the axis of rotation;

wherein the bearing housing includes an outer radial edge flange that includes the second axial surface and the second radial surface, the outer radial edge flange disposed axially between the first housing member and the second housing member; and the first housing member and the bearing housing attached to the second housing member with the fluid gap defined between the wheel and the shroud surface, the first and second axial surfaces abutting against the third axial surface, and the first radial surface abutting against the second radial surface;

wherein the second housing member defines an interior space and an end opening that provides access to the interior space;

further comprising extending the axis of rotation through the end opening;

further comprising disposing a motor within the interior space, the motor configured to drivingly rotate the rotating group about the axis of rotation;

wherein the bearing housing at least partly covers over the end opening of the second housing member;

wherein the bearing is an air bearing with a thrust disc and a journal housing; and wherein the bearing housing supports the thrust disc and the journal housing.

2. The method of claim 1, further comprising facing the first radial surface inward radially and facing the second radial surface outward radially.

3. The method of claim 1, wherein the first housing member is a compressor housing with a compressor shroud surface; and wherein the wheel is a compressor wheel.

4. The method of claim 1, wherein the bearing housing includes a diffuser portion that cooperates with the first housing member to define a diffuser area that is disposed in a downstream direction from the wheel.

5. The method of claim 4, wherein the bearing is an air bearing with a thrust disc and a journal housing;

wherein the bearing housing includes a recess that receives the thrust disc;

wherein the bearing housing includes a base side projection that supports the journal housing; and further comprising attaching a thrust cover to the bearing housing to cover over the thrust disc within the recess.

6. The method of claim 5, wherein the first housing member defines a volute passage.

7. The method of claim 1, wherein the bearing housing includes the outer radial edge flange that includes the second axial surface and the second radial surface, the outer radial edge flange disposed axially between the first housing member and the second housing member, and further comprising sealing a sealing member against the first housing member, the second housing member and the outer radial edge flange.

8. The method of claim 7, further comprising sealing the sealing member against the first housing member, the second housing member and the outer radial edge flange of the bearing housing.

9. The method of claim 8, wherein the first housing member includes a recess that receives the outer radial edge flange.

10. A turbomachine comprising:

a housing assembly including a first housing member having a shroud surface, a second housing member, and a bearing housing;

a rotating group disposed at least partly within the second housing member, the rotating group having a wheel that opposes the shroud surface to define a fluid gap therebetween; a bearing at least partly housed by the bearing housing, the bearing supporting rotation of the rotating group about an axis of rotation;

wherein the first housing member has a first axial surface and the bearing housing has a second axial surface that is flush with the first axial surface;

wherein the second housing member has a third axial surface facing in an axial direction opposite that of the first and second axial surfaces;

wherein the first housing member has a first radial surface and the bearing housing has a second radial surface, the first and second radial surfaces facing in opposing radial directions relative to the axis of rotation;

wherein the bearing housing includes an outer radial edge flange that includes the second axial surface and the second radial surface, the outer radial edge flange disposed axially between the first housing member and the second housing member; and wherein the first housing member and the bearing housing are attached to the second housing member with the fluid gap defined between the wheel and the shroud surface, the first and second axial surfaces abutting against the third axial surface, and the first radial surface abutting against the second radial surface;

wherein the second housing member defines an interior space and an end opening that provides access to the interior space, a motor is disposed within the interior space and configured to drivingly rotate the rotating group about the axis of rotation, and the bearing housing at least partly covers over the end opening of the second housing member; and wherein the bearing is an air bearing with a thrust disc and a journal housing, the bearing housing includes a recess that receives the thrust disc and a base side projection that supports the journal housing, and a thrust cover is attached to the bearing housing to cover over the thrust disc within the recess.

11. The turbomachine of claim 10, wherein a sealing member is sealed against the first housing member, the second housing member and the outer radial edge flange of the bearing housing.

* * * * *